(12) United States Patent
Fukawatase

(10) Patent No.: US 9,033,362 B2
(45) Date of Patent: May 19, 2015

(54) FRONT PASSENGER SEAT AIR BAG APPARATUS

(75) Inventor: Osamu Fukawatase, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 9 days.

(21) Appl. No.: 13/597,830

(22) Filed: Aug. 29, 2012

(65) Prior Publication Data

US 2013/0049336 A1 Feb. 28, 2013

(30) Foreign Application Priority Data

Aug. 30, 2011 (JP) .................................. 2011-187642

(51) Int. Cl.
*B60R 21/2338* (2011.01)
*B60R 21/239* (2006.01)

(52) U.S. Cl.
CPC ............ *B60R 21/239* (2013.01); *B60R 21/2338* (2013.01); *B60R 2021/23384* (2013.01); *B60R 2021/2395* (2013.01)

(58) Field of Classification Search
CPC .... B60R 21/20; B60R 21/205; B60R 21/217; B60R 21/2338; B60R 21/239; B60R 2021/23388; B60R 2021/23384; B60R 2021/2395
USPC ............................ 280/728.2, 732, 729, 743.2
See application file for complete search history.

(56) References Cited

U.S. PATENT DOCUMENTS

| | | | |
|---|---|---|---|
| 5,087,067 A * | 2/1992 | Seki et al. ...................... 280/732 |
| 6,513,835 B2 | 2/2003 | Thomas |
| 6,648,371 B2 * | 11/2003 | Vendely et al. ................ 280/739 |
| 6,851,703 B2 * | 2/2005 | Dahmen ...................... 280/728.2 |
| 7,328,915 B2 * | 2/2008 | Smith et al. .................... 280/739 |
| 7,413,218 B2 | 8/2008 | Ekdahl |
| 7,628,422 B2 * | 12/2009 | Fukawatase et al. .......... 280/739 |
| 7,690,683 B2 * | 4/2010 | Parks et al. ................. 280/743.2 |
| 7,810,841 B2 * | 10/2010 | Fukawatase et al. .......... 280/739 |
| 7,841,623 B2 | 11/2010 | Ito |
| 7,946,618 B2 | 5/2011 | Fukawatase et al. |
| 2007/0194561 A1 * | 8/2007 | Thomas ...................... 280/728.2 |
| 2009/0079175 A1 | 3/2009 | Morita et al. |
| 2009/0236837 A1 * | 9/2009 | Fukawatase et al. .......... 280/739 |
| 2010/0078924 A1 | 4/2010 | Mitsuo et al. |
| 2010/0090445 A1 * | 4/2010 | Williams et al. ............ 280/728.2 |

FOREIGN PATENT DOCUMENTS

| | | | |
|---|---|---|---|
| JP | 09-142245 | * | 6/1997 |
| JP | 09-142245 A | | 6/1997 |
| JP | 2004-155420 A | | 6/2004 |
| JP | 2008230610 A | | 10/2008 |
| JP | 2009-090965 | * | 4/2009 |
| JP | 2009090965 A | | 4/2009 |
| JP | 2009-190626 A | | 8/2009 |
| JP | 2009-227047 A | | 10/2009 |
| JP | 2010-083175 A | | 4/2010 |

* cited by examiner

*Primary Examiner* — James English
(74) *Attorney, Agent, or Firm* — Gifford, Krass, Sprinkle, Anderson & Citkowski, P.C.

(57) ABSTRACT

In a front passenger seat air bag apparatus, an inflator for supplying gas to an air bag is formed in a cylindrical shape and arranged with a vehicle width direction being an axial direction. Also, the inflator is attached to a bottom wall portion formed on a case, with an axial portion of the inflator being offset farther toward a vehicle front side than a center portion, in the vehicle longitudinal direction, of the bottom wall portion. Meanwhile, an actuator for opening and closing a vent hole provided in the air bag is attached to the bottom wall portion farther toward a vehicle rear side than the inflator.

5 Claims, 9 Drawing Sheets

FRONT PASSENGER SEAT AIR BAG APPARATUS

CROSS REFERENCE TO RELATED APPLICATIONS

This application claims priority to Japanese Patent Application No. 2011-187642 filed on Aug. 30, 2011, which is incorporated herein by reference in its entirety including the specification, drawings and abstract.

BACKGROUND OF THE INVENTION

1. Field of the Invention

The invention relates to a front passenger seat air bag apparatus.

2. Description of Related Art

U.S. Pat. No. 6,513,835, for example, describes a related vehicle air bag apparatus that includes an inflator that supplies gas to an air bag, and a moving member that is arranged lined up with the inflator in the vertical direction of the vehicle, and that is able to release a tether provided on the air bag from a retained state.

However, when the inflator and the moving member are arranged lined up in the vertical direction of the vehicle, the dimension of the vehicle air bag apparatus in the vertical direction of the vehicle increases, and as a result, it may be difficult to mount the vehicle air bag apparatus to an instrument panel.

SUMMARY OF THE INVENTION

The invention thus provides a front passenger seat air bag apparatus that can be made small in the vertical direction of a vehicle, and thus can be easily mounted to an instrument panel.

One aspect of the invention relates to a front passenger seat air bag apparatus that includes a case that is a box that is arranged on an underside of an air bag door provided in a portion of an instrument panel in front of a front passenger seat, and that has a bottom wall portion that opposes the air bag door, and that is open on the air bag door side; an air bag that is housed folded in the case; a tubular tube vent that is provided in the air bag and forms a vent hole for communicating inside of the air bag with outside of the air bag; a tether, one end side of which passes through the inside of the air bag and is connected to a tip end portion of the tube vent; an inflator that is formed in a cylindrical shape and is arranged with a vehicle width direction being an axial direction, and that is attached to the bottom wall portion, with an axial center offset to a vehicle front side with respect to a center, in a vehicle longitudinal direction, of the bottom wall portion, and that supplies gas to the air bag; and an actuator that is attached to the bottom wall portion on a vehicle rear side of the inflator. The actuator is selectively placed in one of a first operating state that holds the other end side of the tether and closes the vent hole by pulling the tip end portion of the tube vent into the air bag by the tether when the air bag deploys, and a second operating state that releases the other end side of the tether and opens the vent hole by making the tube vent protrude outside of the air bag when the air bag deploys.

In the front passenger seat air bag apparatus according to this aspect, the inflator is formed in a cylindrical shape and is arranged with the vehicle width direction being the axial direction. Also, this inflator is attached to the bottom wall portion that is formed on the case, with an axial center offset to a vehicle front side with respect to a center, in a vehicle longitudinal direction, of the bottom wall portion. Meanwhile, the actuator is attached to the bottom wall portion to the vehicle rear side of the inflator. Therefore, the inflator and the actuator are arranged offset in the vehicle longitudinal direction, so the front passenger seat air bag apparatus can be made smaller in the vehicle vertical direction, and thus can easily be mounted to the instrument panel.

In the front passenger seat air bag apparatus described above, the tube vent may be provided on a side wall portion of the air bag when the air bag is in a deployed state, and the actuator may be arranged on an end portion, from among end portions on both sides in the vehicle width direction of the bottom wall portion, on a side corresponding to the tube vent.

According to this front passenger seat air bag apparatus, the actuator is arranged on an end portion of the bottom wall portion that is on a side corresponding to the tube vent, from among end portions that are on both sides of the bottom wall portion in the vehicle width direction. Therefore, the length of the tether can be shortened, and the vent hole can be opened and closed quickly.

In this front passenger seat air bag apparatus, the actuator may be provided below, with respect to a vertical direction of the vehicle, the bottom wall portion, and may include an actuator main body, at least one axial end portion of which abuts against a lower surface of the bottom wall portion, a holding portion that is provided on one axial end portion of the actuator main body, and a bracket that fixes the other axial end portion of the actuator main body to the bottom wall portion. Also, the other end side of the tether may pass through the bottom wall portion from above the holding portion, with respect to the vertical direction of the vehicle, and be held by the holding portion.

According to the front passenger seat air bag apparatus having this structure, the holding portion that holds the other end side of the tether is provided on one axial end portion of the actuator main body. Therefore, when the tip end portion of the tube vent is pulled in by the tether when the air bag deploys, a load is applied upward in the vehicle vertical direction to the one axial end portion of the actuator main body. At least one axial end portion of this actuator main body is abutting against the lower surface of the bottom wall portion. Therefore, the one axial end portion of the actuator main body does not need to be fixed to the bottom wall portion. Only the other axial end portion of the actuator main body needs to be fixed to the bottom wall portion. Therefore, the bracket can be made smaller. Also, making the bracket smaller enables both the weight and cost the front passenger seat air bag apparatus to be reduced.

In this front passenger seat air bag apparatus, the actuator main body may be arranged with the vehicle longitudinal direction being an axial direction and fixed to the bottom wall portion, and the actuator may also include a connector that is fixed, with the vehicle longitudinal direction being an inserting/removing direction, to a rear portion of the actuator main body.

According to the front passenger seat air bag apparatus having this structure, the connector that is provided on the actuator is fixed, with the vehicle longitudinal direction being the inserting/removing direction, to a rear portion of the actuator main body that is arranged with the vehicle longitudinal direction being the axial direction. Therefore, the connector is able to be inserted and removed in a position closer to the rear end portion of the case, so workability when inserting and removing the connector is able to be improved.

In the front passenger seat air bag apparatus according to the aspect described above, the tube vent may be provided on a side wall portion of the air bag when the air bag is in a deployed state. Also, the actuator may include an actuator main body that is arranged with the vehicle width direction being an axial direction and is fixed to the bottom wall portion, and a holding portion that is provided on an end portion, from among end portions on both sides in an axial direction of the actuator main body, on a side corresponding to the tube vent, and that holds the other end side of the tether.

According to the front passenger seat air bag apparatus having this structure, the holding portion that holds the other end side of the tether is provided on the end portion, from among the end portions on both sides in an axial direction of the actuator main body, on the side corresponding to the tube vent. Therefore, the length of the tether is able to be shortened, and the vent hole is able to be opened and closed quickly.

In the front passenger seat air bag apparatus according to the aspect described above, the actuator may include an actuator main body that is arranged on an end portion on one side in the vehicle width direction of the bottom wall portion and is fixed to the bottom wall portion, and a connector that is fixed, with the vehicle width direction being an inserting/removing direction, to an end portion on one side in the vehicle width direction of the actuator main body.

According to the front passenger seat air bag apparatus having this structure, the actuator main body is arranged on an end portion on one side in the vehicle width direction of the bottom wall portion of the case, and the connector is fixed, with the vehicle width direction being the inserting/removing direction, to an end portion on one side in the vehicle width direction of the actuator main body. Therefore, the connector is able to be inserted and removed in a position closer to the side end portion of the case, so workability when inserting and removing the connector is able to be improved.

In the front passenger seat air bag apparatus according to the aspect described above, the tube vent is provided on a side wall portion on an inside in the vehicle width direction when the air bag is in a deployed state.

According to the front passenger seat air bag apparatus having this structure, the tube vent is provided on the side wall portion of the air bag on the inside in the vehicle width direction (i.e., on a driver seat side; the side opposite the side surface portion of the vehicle cabin) when the air bag is in a deployed state. Therefore, even if the other end side of the tether is released and the tube vent protrudes outside from the side wall portion of the air bag when the air bag deploys, the tube vent can still be prevented from interfering with a side surface portion of the vehicle cabin, such as a side window glass or a front pillar, for example.

The invention thus enables a front passenger seat air bag apparatus to be made small in the vertical direction of the vehicle, and thus easily able to be mounted to an instrument panel.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
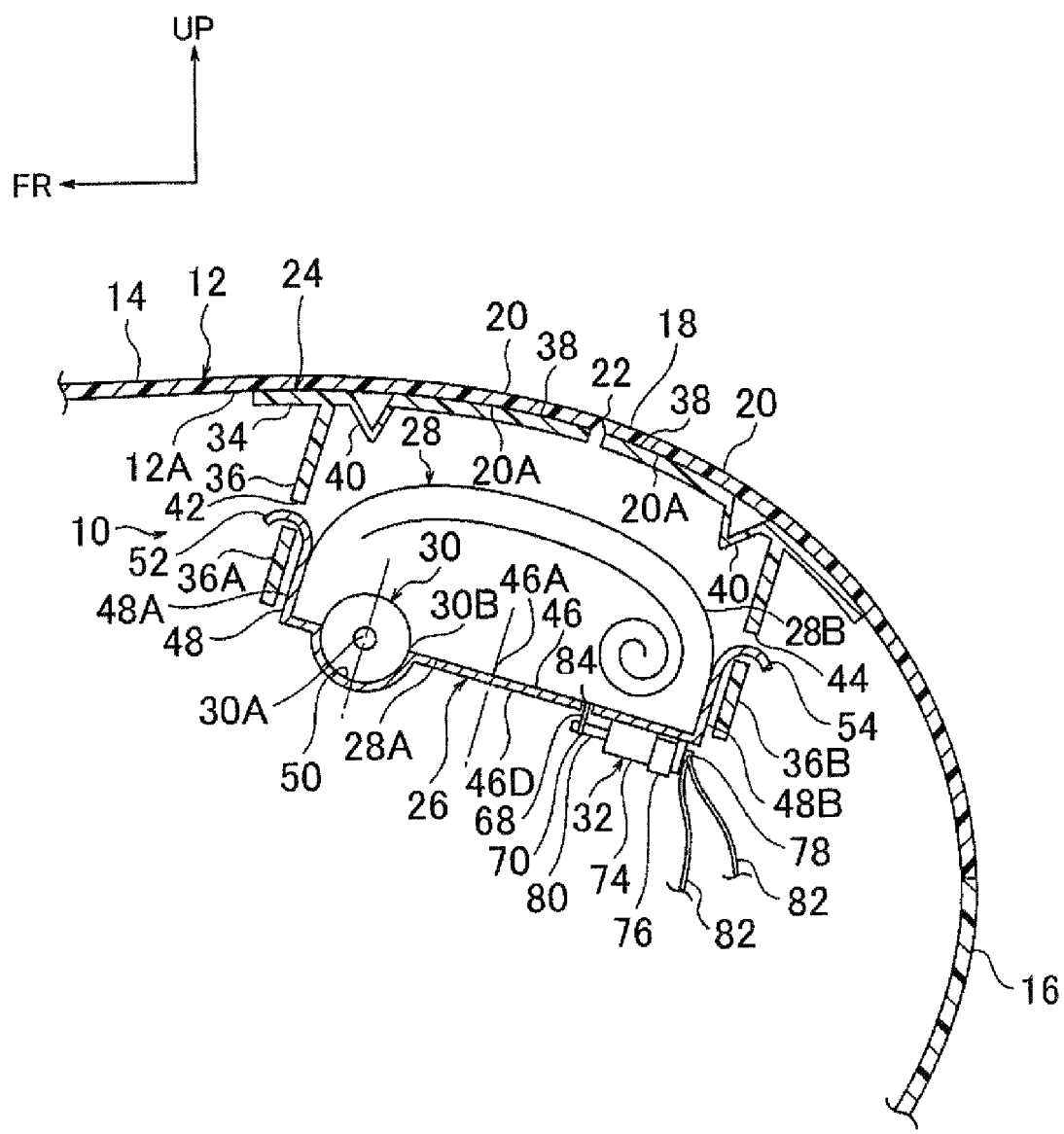
FIG. 1 is a side sectional view of an instrument panel to which a front passenger seat air bag apparatus according to one example embodiment of the invention has been applied.

Hereinafter, an example embodiment of the invention will be described with reference to the accompanying drawings.

Arrows UP, FR, and RH in the drawings indicate an upward direction with respect to the vertical direction of the vehicle, the front with respect to the longitudinal direction of the vehicle, and an outside (the right side) in the vehicle width direction, respectively.

An instrument panel 12 shown in FIG. 1 is an object to which a front passenger seat air bag apparatus 10 according to the example embodiment of the invention has been applied, and is for a vehicle with a steering wheel on the left side, as an example. A vertically middle portion 18 that curves to form a protrusion upward and toward the rear with respect to the vehicle is formed on a portion of the instrument panel 12 that is in front of a front passenger seat, between an upper portion 14 and a lower portion 16 of the instrument panel 12. A pair of air bag doors 20 that is lined up in the vehicle longitudinal direction is formed in this vertically middle portion 18, and a thin tear line 22 that extends in the vehicle width direction is formed between open end portions of this pair of air bag doors 20.

Also, more specifically, the front passenger seat air bag apparatus 10 is provided on the vertically middle portion 18 in which this pair of air bag doors 20 is formed. That is, this front passenger seat air bag apparatus 10 is a mid-mount front passenger seat air bag apparatus that is provided on the vertically middle portion 18. This front passenger seat air bag apparatus 10 includes a retainer 24, a case 26, an air bag 28, an inflator 30, and an actuator 32.

The retainer 24 is provided on an underside of the pair of air bag doors 20, and includes a flange portion 34, a frame portion 36, a pair of door reinforcing portions 38, and a pair of hinge portions 40. The flange portion 34 is formed around the pair of air bag doors 20, and is joined to an underside surface 12A of the instrument panel 12 by adhesion or the like, for example.

The frame portion 36 is formed in a frame-shape along the inside of the flange portion 34, and protrudes from this flange portion 34 toward the front and downward with respect to the vehicle (also referred to as the "vehicle front side" and the "vehicle lower side", respectively) (that is, the center axis of the frame portion 36 is inclined with respect to the vertical direction of the vehicle so that it heads toward the front of the vehicle as it heads downward with respect to the vehicle). Retaining holes 42 and 44 are formed in a front wall portion 36A and a rear wall portion 36B, respectively, of this frame portion 36. These retaining holes 42 and 44 pass through the front wall portion 36A and the rear wall portion 36B in the thickness direction.

The pair of door reinforcing portions 38 is joined to underside surfaces 20A of the pair of air bag doors 20 by adhesion or the like, for example. Also, this pair of door reinforcing portions 38 is connected one to the front wall portion 36A and the other to the rear wall portion 36B of the frame portion 36, via the hinge portions 40. The hinge portions 40 are each formed such that a sectional shape cut in the vehicle longitudinal direction forms a V-shape.

The case 26 is arranged on the underside of the pair of air bag doors 20, and is housed inside the frame portion 36. This case 26 has a bottom wall portion 46 that opposes the pair of air bag doors 20, and a peripheral wall portion 48 formed around this bottom wall portion 46, so as to form a box-shape that is open on the side with the pair of air bag doors 20.

A sectional semicircular-shaped concave portion 50 that is recessed to the vehicle lower side is formed in a front portion of the bottom wall portion 46. This concave portion 50 extends in the vehicle width direction, and is formed across the entire bottom wall portion 46 in the vehicle width direction (also see FIG. 4). Also, retaining pieces 52 that extend toward the vehicle front side are formed on a front wall portion 48A of the peripheral wall portion 48, and retaining pieces 54 that extend toward the rear of the vehicle (also referred to as the "vehicle rear side") are formed on a rear wall portion 48B of the peripheral wall portion 48. The retaining pieces 52 are retained in retaining holes 42, and the retaining pieces 54 are retained in retaining holes 44.

Upon receiving a supply of gas from the inflator 30 that will be described later, the air bag 28 pushes the pair of air bag doors 20 open, and deploys on the upper side of the instrument panel 12.

Figure 2:
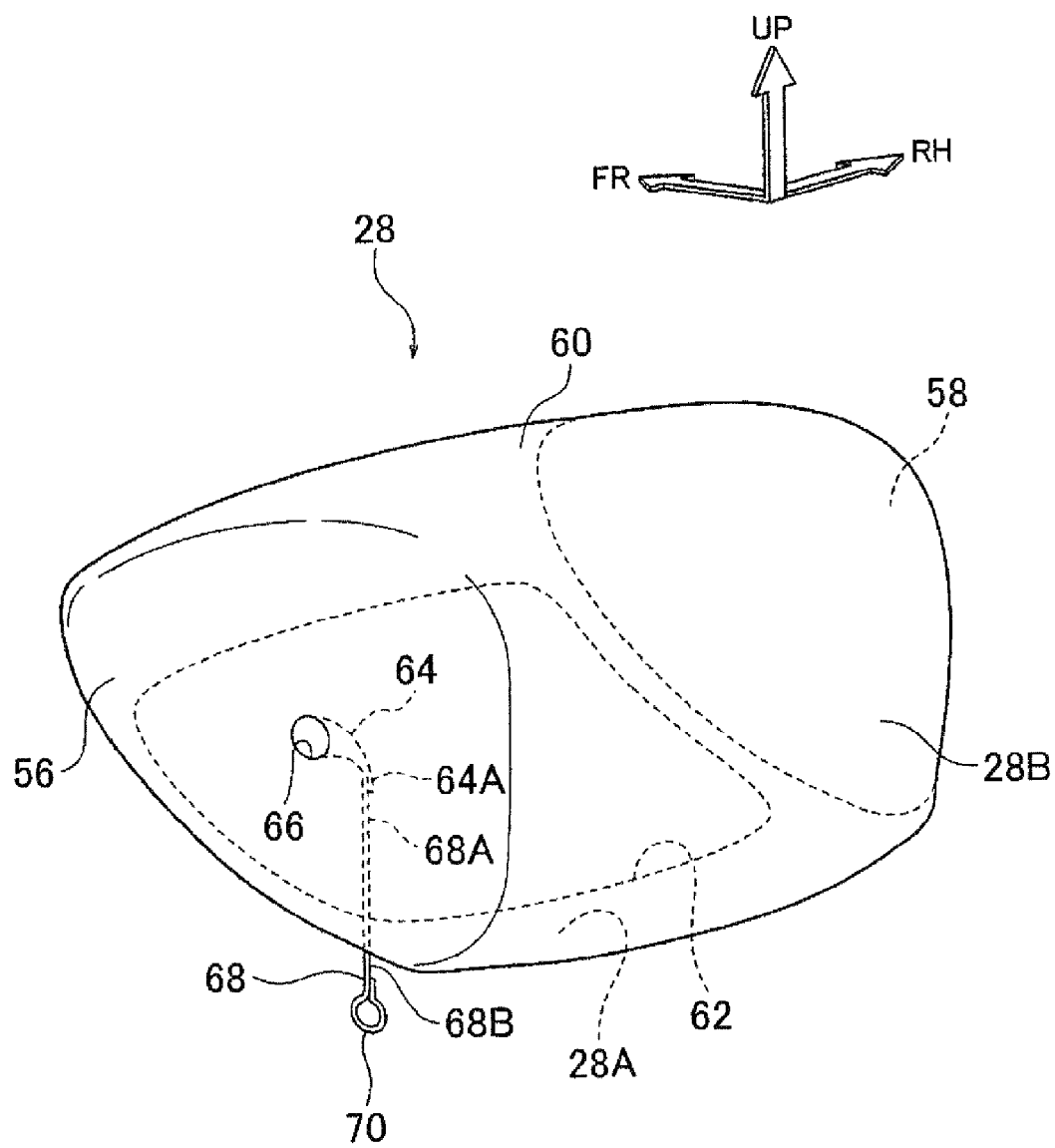
FIG. 2 is a perspective view of a state in which an air bag shown in FIG. 1 is deployed and a vent hole is closed.
Figure 3:
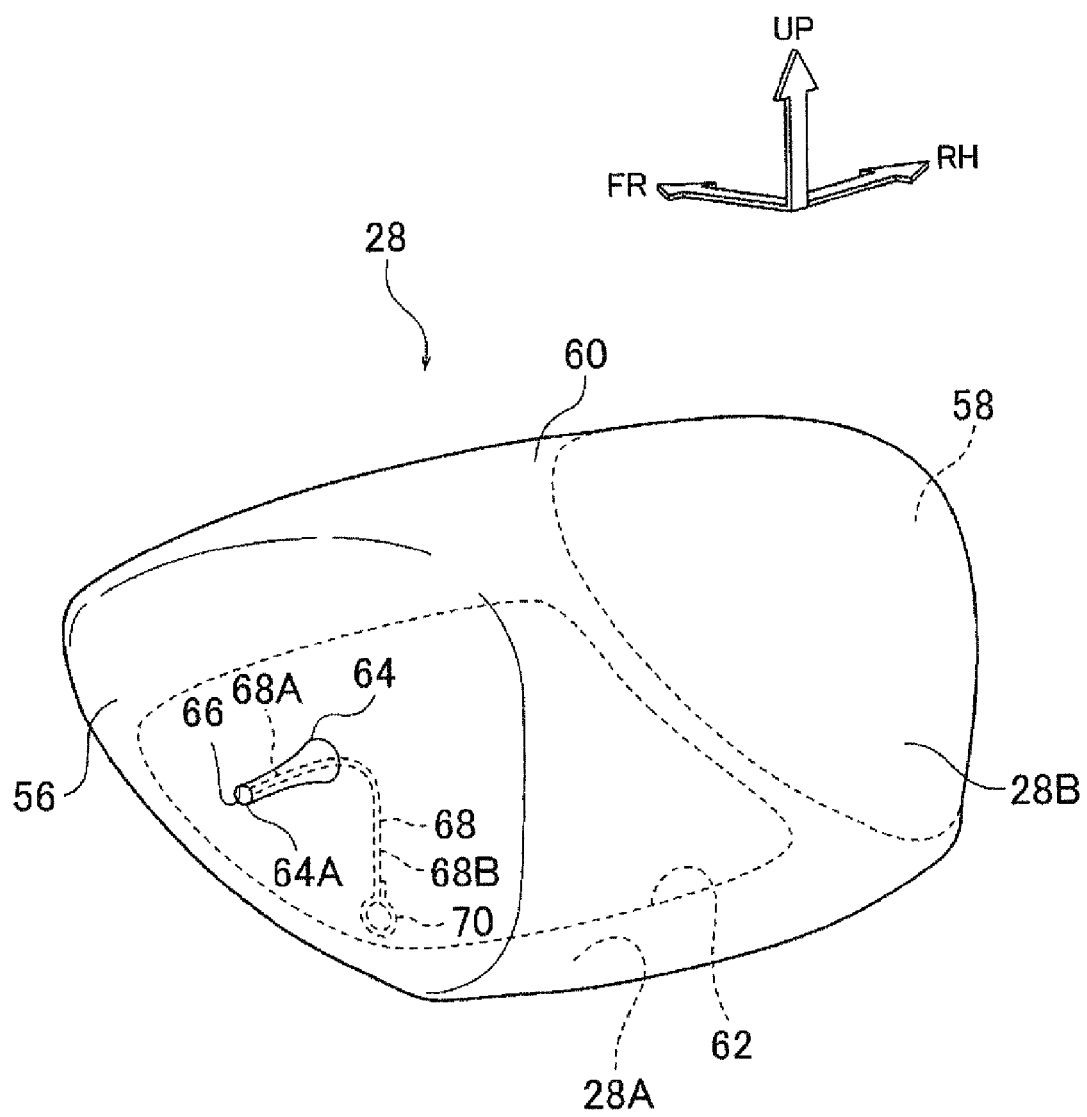
FIG. 3 is a perspective view of a state in which the air bag shown in FIG. 1 is deployed and the vent hole is open.

This air bag 28 is formed in a bag-shape that includes a pair of side base cloths 56 and 58 positioned one on each side in the vehicle width direction when the air bag 28 is in a deployed state, and an outer peripheral base cloth 60 that connects outer peripheral edge portions of the pair of side base cloths 56 and 58 together, as shown in FIGS. 2 and 3. An opening 62 is formed in a portion of the outer peripheral base cloth 60 that forms a base end portion 28A of the air bag 28. The side base cloths 56 and 58 each serve as a side wall portion when the air bag is in a deployed state.

Also, the air bag 28 is housed folded in the case 26, as shown in FIG. 1, and a surrounding portion of the opening 62 (see FIGS. 2 and 3) in the base end portion 28A is fixed to the bottom wall portion 46. Also, a rear portion 28B of the air bag 28 when the air bag 28 is in a deployed state (i.e., a portion that catches (i.e., receives) the upper body of an occupant seated in the front passenger seat) is rolled up with the vehicle width direction as the center, and housed on the vehicle rear side of the inflator 30 that will be described later, as shown in FIG. 1.

Also, as shown in FIGS. 2 and 3, a tubular tube vent 64 is provided in the side base cloth 56 that is on the inside in the vehicle width direction, among the pair of side base cloths 56 and 58 that forms this air bag 28. A hole formed on the inside of this tube vent 64 serves as a vent hole 66 for communicating the inside of the air bag 28 with the outside of the air bag 28, as will be described later.

Also, this air bag 28 has a thin band-shaped tether 68. One end side 68A of this tether 68 passes through the inside of the air bag 28 and is connected to a tip end portion 64A of the tube vent 64. Meanwhile, a loop portion 70 is formed on the other end side 68B of the tether 68. The other end side 68B of the tether 68 extends through the opening 62 described above to the vehicle lower side.

Figure 4:
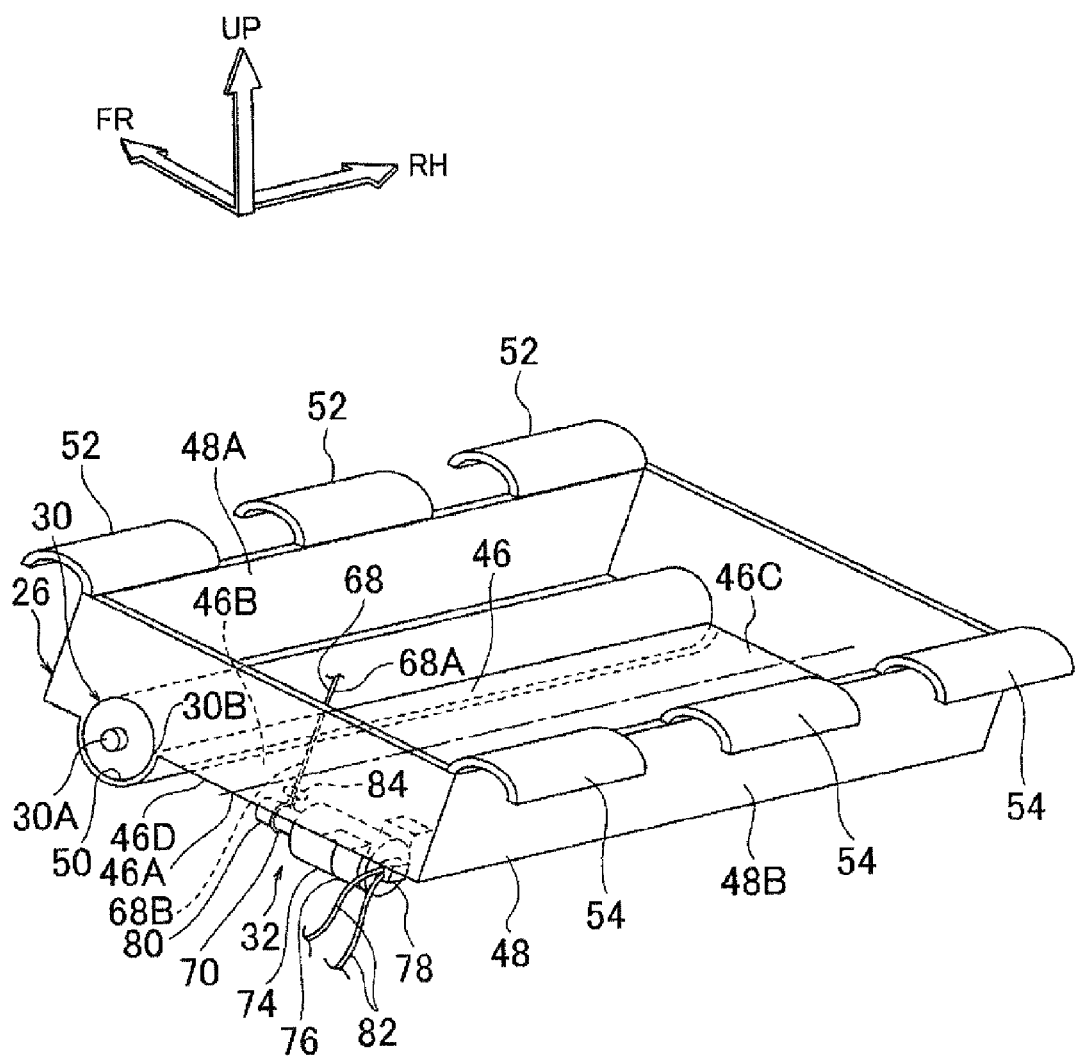
FIG. 4 is a perspective view of a case, an inflator, and an actuator shown in FIG. 1.
Figure 5:
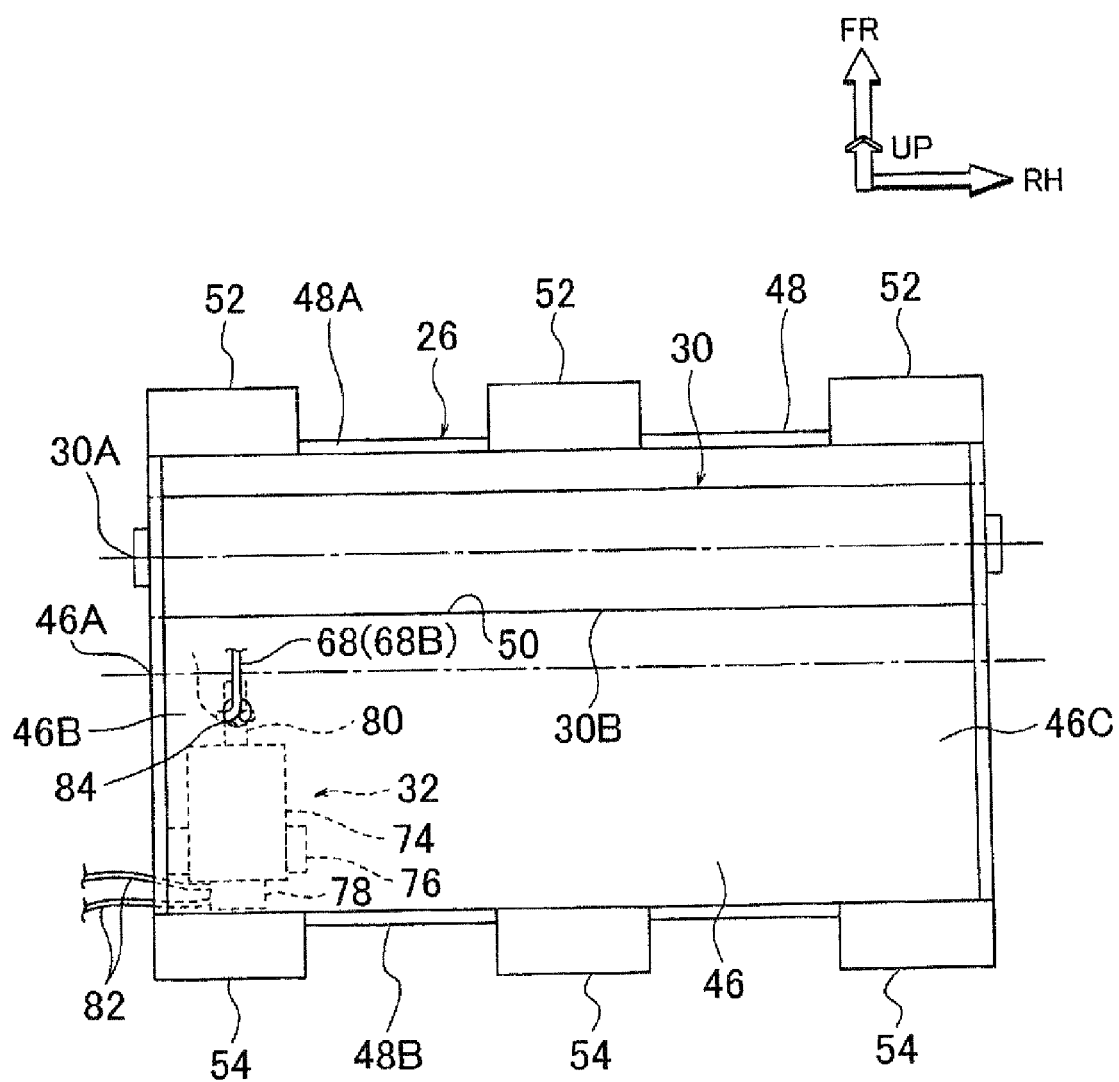
FIG. 5 is a plan view of the case, the inflator, and the actuator shown in FIG. 1.

As shown in FIGS. 4 and 5, the inflator 30 is formed in a cylindrical shape and arranged with the vehicle width direction being the axial direction. This inflator 30 is housed in the concave portion 50 described above, and as a result, the entire concave portion 50 is offset to the vehicle front side with respect to a center portion 46A in a vehicle longitudinal direction of the bottom wall portion 46. Also, this inflator 30 is attached to the bottom wall portion 46 by a bracket or the like, not shown, while housed in this concave portion 50, and is arranged inside of the opening 62 formed in the base end portion 28A of the air bag 28 described above (see FIGS. 2 and 3). Also, this inflator 30 is connected to a control unit via a signal wire, neither of which is shown.

The actuator 32 is attached to the bottom wall portion 46 on the vehicle rear side of the inflator 30. More specifically, this actuator 32 is arranged on an end portion 46B, from among end portions 4613 and 46C on both sides in the vehicle width direction of the bottom wall portion 46, that is on a side corresponding to the tube vent 64 described above (see FIGS. 2 and 3) (i.e., on the inside in the vehicle width direction), as shown in FIGS. 4 and 5.

Figure 6:
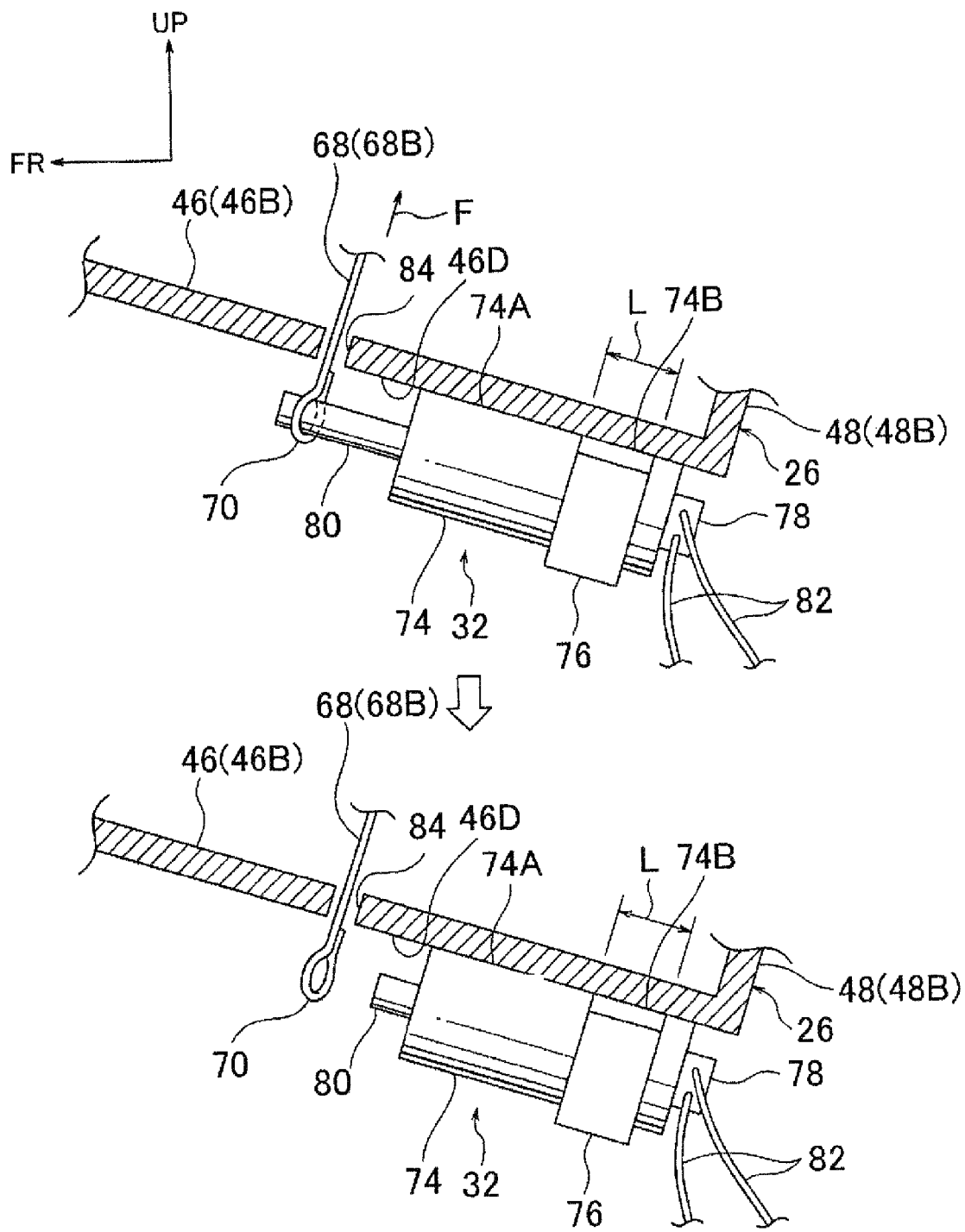
FIG. 6 is an expanded view of the main portions in FIG. 1, showing how a rod of the actuator is displaced from a protruding position to a retracted position.

This actuator 32 has an actuator main body 74, a bracket 76, a connector 78, and a rod 80, shown in FIG. 6. The actuator main body 74 is arranged with the vehicle longitudinal direction being the axial direction. This actuator main body 74 is provided on the vehicle lower side of the bottom wall portion 46 (i.e., below the bottom wall portion 46 in the vertical direction of the vehicle), and the entire actuator main body 74, including a front portion 74A thereof, abuts against a lower surface 46D of the bottom wall portion 46.

The bracket 76 is formed of a length (i.e., an overlap length L) that overlaps with a rear portion 74B of the actuator main body 74 in the axial direction, and fixes the rear portion 74B of the actuator main body 74 to the bottom wall portion 46. The connector 78 is fixed, with the vehicle longitudinal direction being the inserting/removing direction, to the rear portion 74B of the actuator main body 74, and is connected to the control unit, not shown, described above via a signal wire 82.

The rod 80 extends in the vehicle longitudinal direction along the bottom wall portion 46, and is provided on the front portion 74A of the actuator main body 74. This rod 80 is able to be displaced from a protruding position in which it protrudes to the vehicle front side from the actuator main body 74 as shown in the upper drawing in FIG. 6, to a retracted position in which it is retracted to the actuator main body 74 side as shown in the lower drawing in FIG. 6. This displacement of the rod 80 is performed by gas produced inside the actuator main body 74.

Also, a through-hole 84 is formed on a vehicle upper side of the rod 80 (i.e., above the rod 80 in the vertical direction of the vehicle), when the rod 80 is in the protruding position, in the bottom wall portion 46 described above, and the other end side 68B of the tether 68 described above is inserted through the through-hole 84 from the vehicle upper side. Also, the loop portion 70 is engaged with the rod 80 in the protruding position described above, and as a result, the other end side 68B of the tether 68 is held by the rod 80.

Also, this actuator 32 operates to keep the rod 80 in the protruding position, as shown in the upper drawing in FIG. 6, or to displace the rod 80 to the retracted position from the protruding position, as shown in the lower drawing in FIG. 6, according to a signal output from the control unit, not shown, described above.

Also, when the rod 80 is kept in the protruding position, the other end side 68B of the tether 68 is kept held by the rod 80 as a result of the loop portion 70 being engaged with the rod 80, as shown in the upper drawing in FIG. 6. On the other hand, when the rod 80 is displaced to the retracted position, the rod 80 is withdrawn from the loop portion 70, such that the other end side 68B of the tether 68 is released from the rod 80, as shown in the lower drawing in FIG. 6.

The operating state of the actuator 32 when the rod 80 is held in the protruding position serves as a first operating state of the actuator of the invention, and the operating state of the actuator 32 when the rod 80 is displaced to the retracted position serves as a second operating state of the actuator of the invention. Also, the front portion 74A of the actuator main body 74 serves as one axial end portion of the actuator of the invention, and the rear portion 74B of the actuator main body 74 serves as the other axial end portion of the actuator of the invention. Further, the rod 80 serves as a holding portion of the invention.

Next, the operation of the front passenger seat air bag apparatus 10 according to the example embodiment of the invention will be described.

With the front passenger seat air bag apparatus 10 according to the example embodiment of the invention, acceleration or deceleration of the vehicle is detected by a detector such as an acceleration sensor. When a detection signal output from this detector is received by the control unit, neither of which is shown, the inflator 30 shown in FIG. 1 activates. When the inflator 30 activates, a large amount of gas is instantaneously produced by the inflator 30.

The gas produced by the inflator 30 in this way is supplied to the air bag 28, causing the air bag 28 to inflate. When the air bag 28 inflates, it pushes against the pair of air bag doors 20 from the underside of the instrument panel 12. As a result, the tear line 22 tears, and one of the pair of air bag doors 20 swings toward the vehicle front side and the other swings toward the vehicle rear side, with the hinge portions 40 as the fulcrums.

Accordingly, an opening is created in the vertically middle portion 18 of the instrument panel 12, and the air bag 28 deploys through the opening to the upper side of the instrument panel 12 i.e., in front of the front passenger seat. As a result, the upper body of an occupant seated in the front passenger seat is caught by the deployed air bag 28.

Here, when the air bag 28 deploys in this way, the rod 80 is held in the protruding position, as shown in the upper drawing in FIG. 6, when it is determined in a control unit, not shown, that the occupant sitting in the front passenger seat does not have a small build, based on a signal from a detector such as a load sensor provided in the front passenger seat, for example. As a result, the other end side 68B of the tether 68 is kept held to the rod 80 by the loop portion 70 being engaged with the rod 80.

Therefore, in this state, when the air bag 28 inflates and deploys as described above, the tip end portion 64A of the tube vent 64 is pulled into the air bag 28 by the tether 68, as shown in FIG. 2, and the tube vent 64 is crushed by the internal pressure of the air bag 28, so the vent hole 66 closes. As a result, the internal pressure of the air bag 28 when the air bag 28 is deployed is maintained, so the deployed air bag 28 is able to effectively catch the upper body of an occupant, even if the occupant has a relatively large build.

On the other hand, if it is determined in the control unit, not shown, that the occupant sitting in the front passenger seat has a small build based on a signal from a detector such as the load sensor described above, an actuation signal is output from this control unit to the actuator 32. Then, gas is produced inside the actuator main body 74, for example, and this gas displaces the rod 80 from the protruding position to the retracted position, as shown in the lower drawing in FIG. 6. As a result, the rod 80 withdraws from the loop portion 70, such that the other end side 68B of the tether 68 is released from the rod 80.

Therefore, in this state, when the air bag 28 inflates and deploys as described above, the tube vent 64 is pushed outside of the air bag 28 while gradually inverting, by the internal pressure of the air bag 28, as shown in FIG. 3. Then the actuator main body 74 protrudes outside the air bag 28, and the vent hole 66 opens. As a result, the gas inside of the air bag 28 is released through the vent hole 66, so the internal pressure of the air bag 28 decreases, such that the impact from the air bag 28 on an occupant with a relatively small build is reduced.

Next, the operation and effects of the front passenger seat air bag apparatus 10 according to the example embodiment of the invention will be described.

With the front passenger seat air bag apparatus 10 according to the example embodiment of the invention, the inflator 30 is formed in a cylindrical shape and arranged with the vehicle width direction being the axial direction, as shown in FIGS. 4 and 5. Also, this inflator 30 is attached to the bottom wall portion 46 that is formed on the case 26, with the entire inflator 30 offset to the vehicle front side with respect to the center portion 46A in the vehicle longitudinal direction of the bottom wall portion 46.

Meanwhile, the actuator 32 is attached to the bottom wall portion 46 on the vehicle rear side of the inflator 30. Therefore, the inflator 30 and the actuator 32 are arranged offset from one another in the vehicle longitudinal direction, so the front passenger seat air bag apparatus 10 can be made smaller in the vehicle vertical direction, and thus can easily be mounted to the instrument panel 12.

In particular, as shown in FIG. 1, the front passenger seat air bag apparatus 10 can even be easily mounted to the vertically middle portion 18 where the mounting space is small.

Also, the actuator 32 is arranged on the end portion 46B, from among the end portions 46B and 46C on both sides in the vehicle width direction of the bottom wall portion 46, that is on the side corresponding to the tube vent 64 (see FIGS. 2 and 3), as shown in FIGS. 4 and 5. As a result, the length of the tether 68 can be shortened, and the vent hole 66 can be opened and closed quickly.

Further, the tube vent 64 is provided on the side base cloth 56 that is on the inside in the vehicle width direction when the air bag 28 is in a deployed state (i.e., on the front passenger seat side; on the side opposite a side surface portion of the vehicle cabin), as shown in FIG. 3. Therefore, even if the other end side 68B of the tether 68 is released and the tube vent 64 protrudes outside from the side base cloth 56 of the air bag 28 when the air bag 28 deploys, the tube vent 64 can still be prevented from interfering with a side surface portion of the vehicle cabin, such as a side window glass or a front pillar, for example.

Also, as shown in FIG. 6, the rod 80 that holds the other end side 68B of the tether 68 is provided on the front portion 74A of the actuator main body 74. Therefore, when the tip end portion 64A of the tube vent 64 is pulled in by the tether 68 when the air bag 28 deploys, a load F is applied upward in the vehicle vertical direction to the front portion 74A of the actuator main body 74.

The entire actuator main body 74, including the front portion 74A, is abutting against the lower surface 46D of the bottom wall portion 46. Therefore, the front portion 74A of the actuator main body 74 does not need to be fixed to the bottom wall portion 46. Only the rear portion 74B of the actuator main body 74 needs to be fixed to the bottom wall portion 46. Therefore, the bracket 76 can be made smaller. Also, making the bracket 76 smaller enables both the weight and cost the front passenger seat air bag apparatus 10 to be reduced.

Also, the connector 78 is fixed, with the vehicle longitudinal direction being the inserting/removing direction, to the rear portion 74B of the actuator main body 74 that is arranged with the vehicle longitudinal direction being the axial direction. Therefore, the connector 78 is able to be inserted and removed in a position closer to the rear end portion of the case 26, so workability when inserting and removing the connector 78 is able to be improved.

Next, a modified example of the front passenger seat air bag apparatus 10 according to the example embodiment of the invention will be described.

In the example embodiment of the invention described above, the offset amount of the inflator 30 to the vehicle front side with respect to the center portion 46A in the vehicle longitudinal direction of the bottom wall portion 46 is able to be ensured, so the entire inflator 30 is offset to the vehicle front side with respect to the center portion 46A of the bottom wall portion 46, as shown in FIG. 1. However, as long as an axial portion 30A of the inflator 30 is offset to the vehicle front side with respect to the center portion 46A of the bottom wall portion 46, a rear end portion 30B of the inflator 30 may be positioned to the vehicle rear side of the center portion 46A of the bottom wall portion 46.

Also, as shown in FIG. 6, the entire actuator main body 74, including the front portion 74A thereof, is abutted against the lower surface 46D of the bottom wall portion 46, but a mode in which only the front portion 74A of the actuator main body 74 is abutted against the lower surface 46D of the bottom wall portion 46 is also possible.

Also, as shown in FIG. 5, the actuator main body 74 is arranged with the vehicle longitudinal direction being the axial direction, but the actuator main body 74 may also be arranged as described below.

Figure 7:
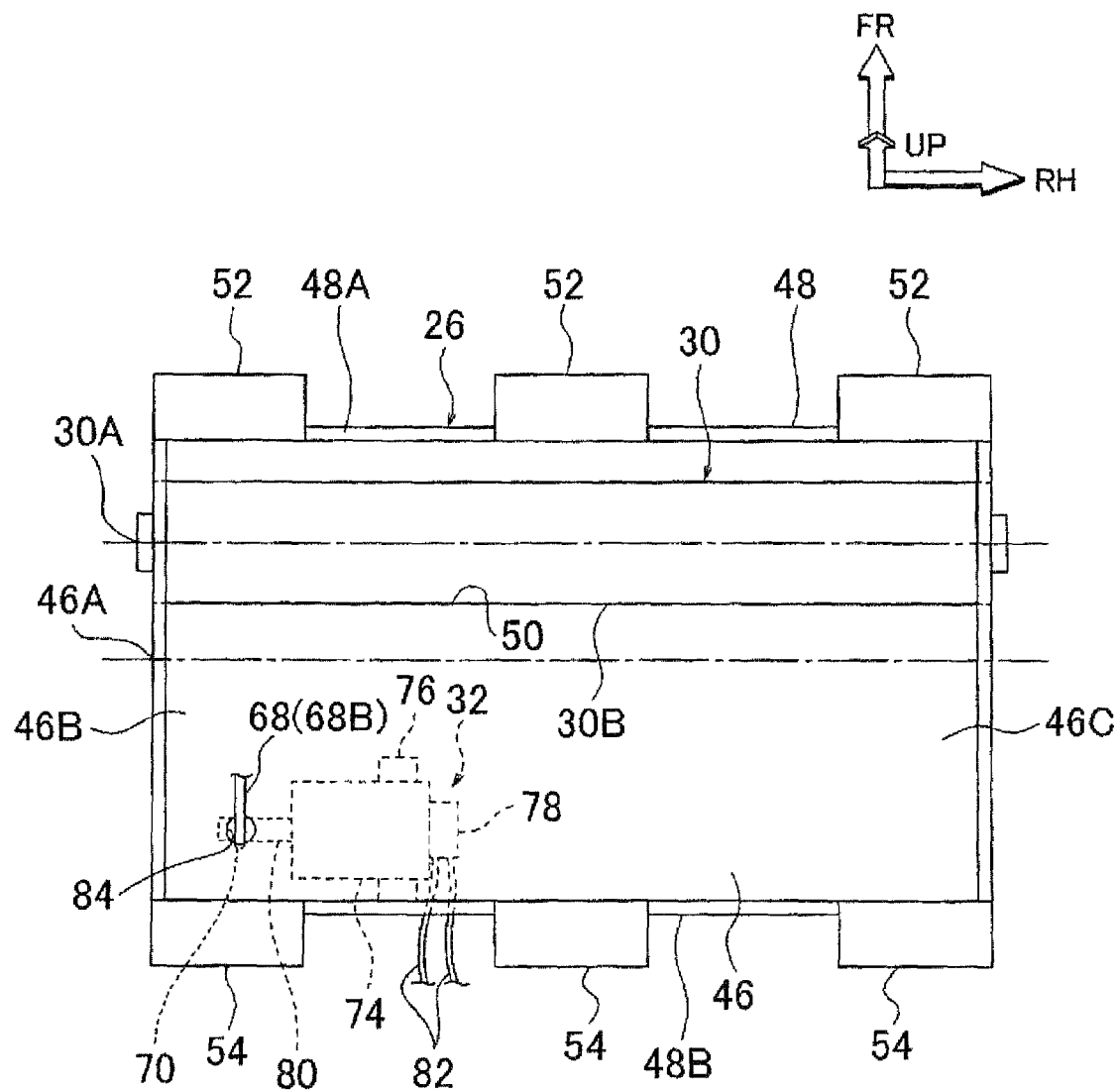
FIG. 7 is a plan view of a first modified example of the arrangement of the actuator shown in FIG. 5.

That is, in a modified example shown in FIG. 7, the actuator main body 74 is arranged with the vehicle width direction being the axial direction. Also, the rod 80 that holds the other end side 68B of the tether 68 is provided on an end portion, from among the end portions on both sides in the axial direction of the actuator main body 74, that is on a side corresponding to the tube vent 64 described above (see FIGS. 2 and 3) (i.e., that is on the inside in the vehicle width direction).

When structured in this way, the length of the tether 68 is able to be made even shorter, and the vent hole 66 is able to be opened and closed even more quickly.

Figure 8:
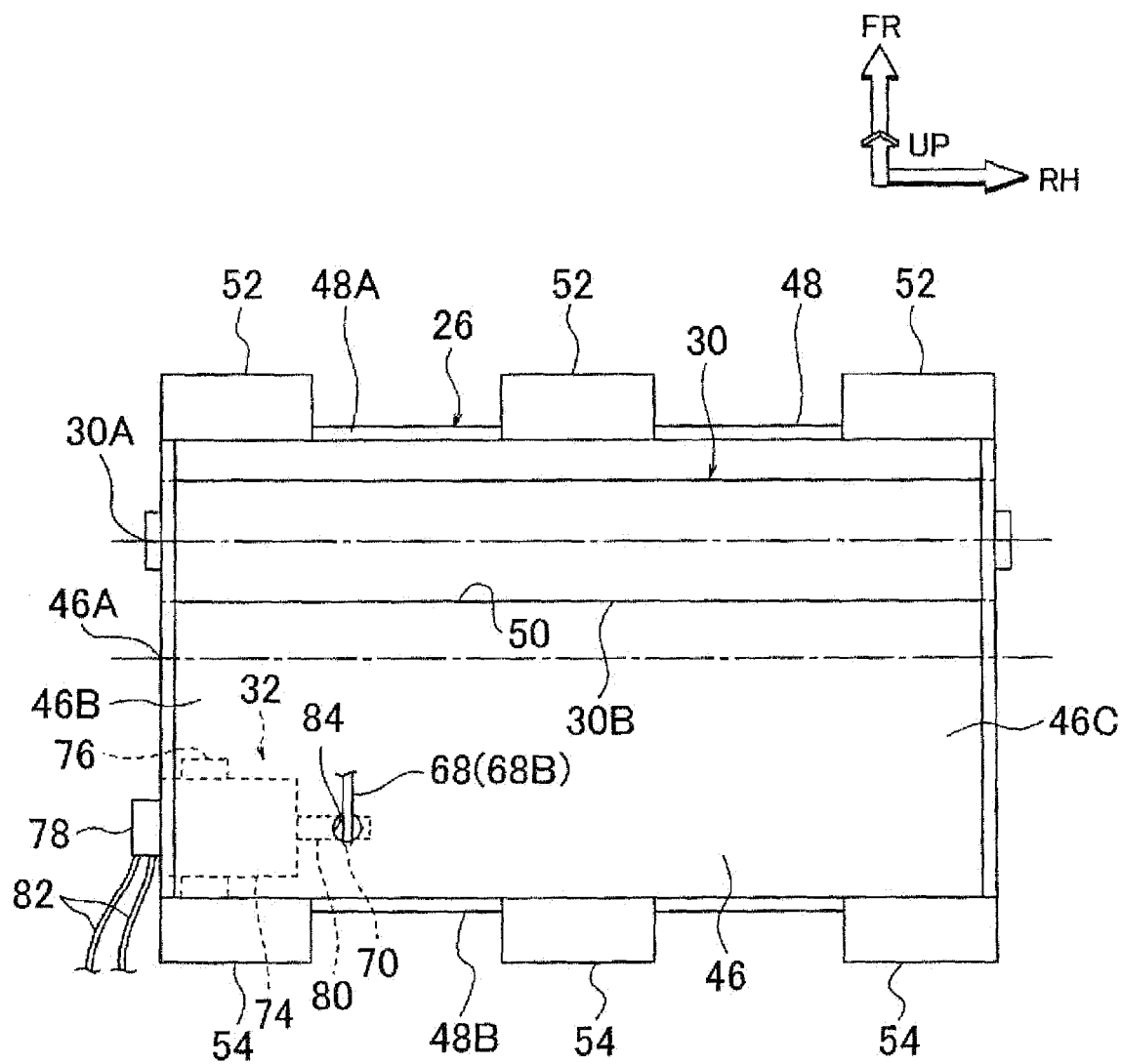
FIG. 8 is a plan view of a second modified example of the arrangement of the actuator shown in FIG. 5.

Also, in a modified example shown in FIG. 8, the actuator main body 74 is arranged with the vehicle width direction being the axial direction, and the connector 78 is fixed, with the vehicle width direction being the inserting/removing direction, to an end portion on the inside in the vehicle width direction of the actuator main body 74 (i.e., on one side in the vehicle width direction).

When structured in this way, the connector 78 is able to be inserted and removed in a position closer to the side end portion of the case 26, so workability when inserting and removing the connector 78 is able to be improved. Also, the connector 78 is able to be prevented from interfering with a side surface portion of the vehicle cabin, so workability when inserting and removing the connector 78 is able to be improved.

Also, the actuator 32 has the rod 80 that is engaged with the loop portion 70 formed on the other end side 68B of the tether 68, as shown in FIG. 6, but the actuator 32 may also be structured as described below.

Figure 9:
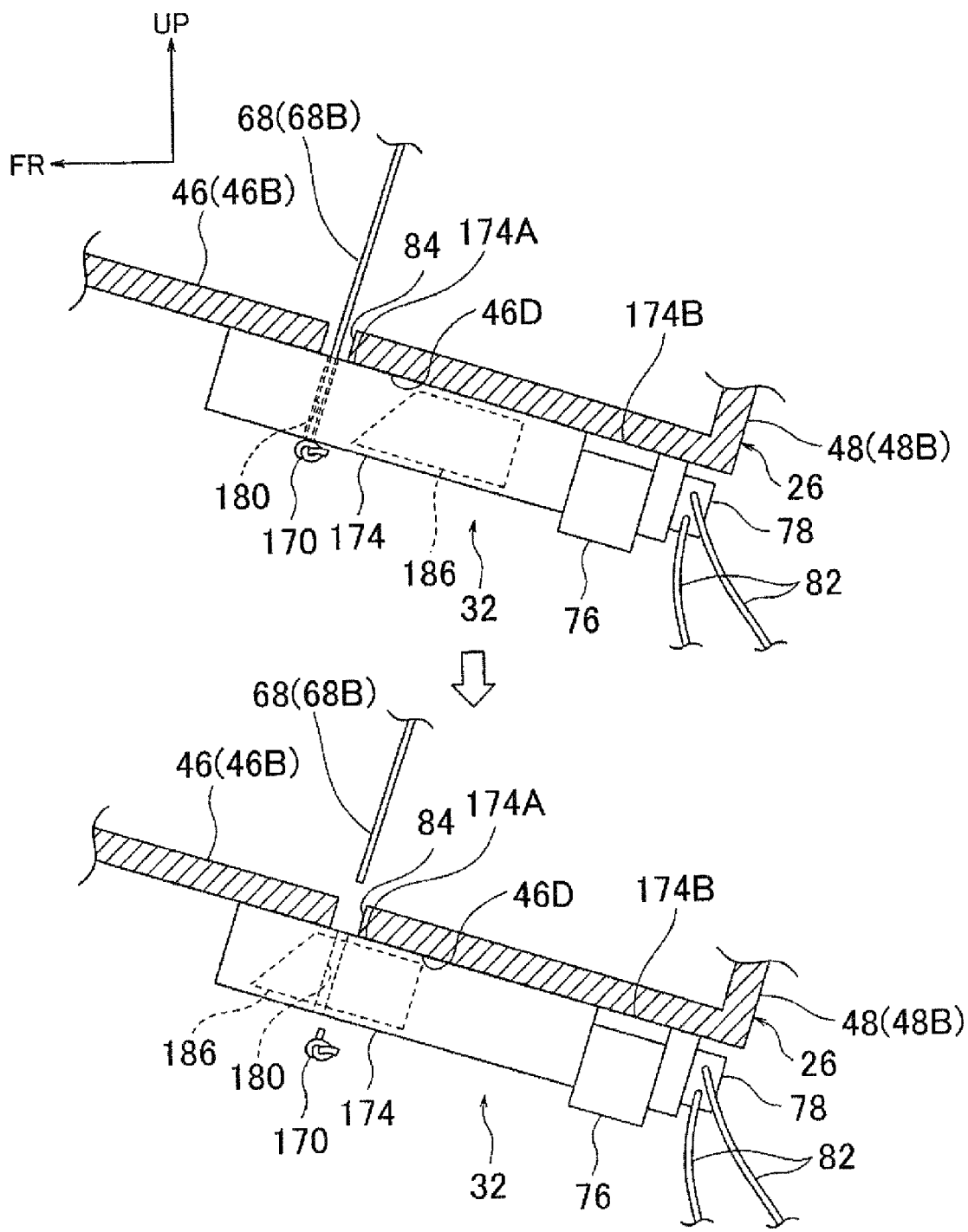
FIG. 9 is a view of a modified example of the actuator shown in FIG. 6, showing a cutter of the actuator being displaced from a retracted position to a cutting position.

That is, in a modified example shown in FIG. 9, the actuator 32 has an actuator main body 174 that extends in the vehicle vertical direction, and a cutter 186 that is housed inside of this actuator main body 174.

A holding hole 180 that passes through in the vehicle vertical direction and is communicated with the through-hole 84 is formed in a front portion 174A of the actuator main body 174. Meanwhile, the other end side 68B of the tether 68 is inserted through the through-hole 84 and the holding hole 180 from the vehicle upper side, and a knot 170 formed by a slipknot is formed on a tip end portion of the other end side 68B of this tether 68. This knot 170 is larger in diameter than the holding hole 180, so the other end side 68B of the tether 68 is held, stopped by the holding hole 180.

The cutter 186 is able to be displaced from a retracted position that is on the vehicle rear side of the holding hole 180, as shown in the upper drawing in FIG. 9, to a cutting position where a tip end of the cutter 186 passes through (i.e., cuts across) the holding hole 180 and cuts the other end side 68B of the tether 68. This displacement of the cutter 186 is performed by gas produced inside of the actuator main body 174, for example.

Also, this actuator 32 operates to keep the cutter 186 in the retracted position, as shown in the upper drawing of FIG. 9, or to displace the cutter 186 from the retracted position to the cutting position, as shown in the lower drawing in FIG. 9, according to a signal output from the control unit, not shown, described above.

Also, when the cutter 186 is kept in the retracted position, the other end side 68B of the tether 68 is kept held by the holding hole 180, as shown in the upper drawing in FIG. 9. On the other hand, when the cutter 186 is displaced to the cutting position, the other end side 68B of the tether 68 is cut by the cutter 186 and released from the holding hole 180, as shown in the lower drawing in FIG. 9.

The operating state of the actuator 32 when the cutter 186 is kept in the retracted position serves as a first operating state of the actuator of the invention, and the operating state of the actuator 32 when the cutter 186 is displaced to the cutting position serves as a second operating state of the actuator of the invention. Also, the holding hole 180 serves as a holding portion of the invention.

With this kind of structure as well, the vent hole 66 is able to be opened and closed just as it is in the example embodiment of the invention described above.

In this modified example shown in FIG. 9 as well, the actuator main body 174 is provided on the vehicle lower side (i.e., below in the vehicle vertical direction) of the bottom wall portion 46, and at least the front portion 174A (i.e., one end portion in the axial direction) is abutting against the lower surface 46D of the bottom wall portion 46, similar to the actuator main body 74 described above (see FIG. 6). Also, a rear portion 174B (i.e., the other end portion in the axial direction) of the actuator main body 174 is fixed to the bottom wall portion 46 by the bracket 76, and the connector 78 is fixed, with the vehicle longitudinal direction being the inserting/removing direction, to the rear portion 174B of the actuator main body 174.

Also, when using the actuator 32 shown in FIG. 9, this actuator 32 may also be arranged as shown in FIGS. 7 and 8.

Also, as shown in FIGS. 2 and 3, the air bag 28 has the pair of side base cloths 56 and 58, and the outer peripheral base cloth 60, but the air bag 28 may also be formed by cloths other than these.

Further, the front passenger seat air bag apparatus 10 described above is applied to the instrument panel 12 in a vehicle with a steering wheel on the left side, but it may also be applied to an instrument panel in a vehicle with a steering wheel on the right side.

While the invention has been described with reference to example embodiments thereof, it should be understood that the invention is not limited to the example embodiments. That is, the invention may be carried out in other modes that have been modified or improved in any of a variety of ways without departing from the scope thereof.

What is claimed is:

1. A front passenger seat air bag apparatus comprising:
a case that is a box that is arranged on an underside of an air bag door provided in a portion of an instrument panel in front of a front passenger seat, and that has a bottom wall portion that opposes the air bag door, and that is open on an air bag door side;
an air bag that is housed folded in the case;
a tubular tube vent that is provided on a side wall portion of the air bag when the air bag is in a deployed state, the tube vent forms a vent hole for communicating inside of the air bag with outside of the air bag;
a tether, one end side of which passes through the inside of the air bag and is connected to a tip end portion of the tube vent;
an inflator that is formed in a cylindrical shape and is arranged with a vehicle width direction being an axial direction of the inflator, and that is attached to the bottom wall portion, with an axial center offset to a vehicle front side with respect to a center, in a vehicle longitudinal direction, of the bottom wall portion, and that supplies gas to the air bag; and
an actuator includes an actuator main body and a holding portion, the actuator main body is fixed to the bottom wall portion of the case with the vehicle width direction being an axial direction of the actuator, the actuator main body is fixed to the bottom wall portion of the case rearward, in the vehicle longitudinal direction, of the inflator, the holding portion is provided on an end portion, from among end portions on both sides in the axial direction of the actuator main body, on a side corresponding to the tube vent, and that holds the other end side of the tether,
wherein the actuator is selectively placed in one of a first operating state that holds the other end side of the tether and closes the vent hole by pulling the tip end portion of the tube vent into the air bag by the tether when the air bag deploys, and a second operating state that releases the other end side of the tether and opens the vent hole by making the tube vent protrude outside of the air bag when the air bag deploys.

2. The front passenger seat air bag apparatus according to claim 1, wherein the actuator is provided below, with respect to a vertical direction of the vehicle, the bottom wall portion, the actuator includes at least one axial end portion of which abuts against a lower surface of the bottom wall portion, the holding portion is provided on one axial end portion of the actuator main body, and a bracket that fixes the other axial end portion of the actuator main body to the bottom wall portion; and the other end side of the tether passes through the bottom wall portion from above the holding portion, with respect to the vertical direction of the vehicle, and is held by the holding portion.

3. The front passenger seat air bag apparatus according to claim 1, wherein the actuator includes a connector that is fixed, with the vehicle width direction being an inserting/removing direction, to an end portion on one side in the vehicle width direction of the actuator main body.

4. The front passenger seat air bag apparatus according to claim 1, wherein the tube vent is provided on the side wall portion of the air bag on an inside in the vehicle width direction when the air bag is in the deployed state.

5. The front passenger seat air bag apparatus according to claim 1, wherein the actuator is provided with a cutter on the actuator main body, and the cutter cuts the other end side of the tether by moving from a retracted position to a cutting position.

* * * * *